United States Patent [19]

Nilsson et al.

[11] 4,014,479
[45] Mar. 29, 1977

[54] SAFETY BELT SYSTEM WITH PYROTECHNICALLY DRIVEN TURNING DEVICE

[76] Inventors: Karl Erik Nilsson, Rontgenstr. 30; Günter Herrmann, Rontgenstr. 24, both of, 8012 Ottobrunn, Germany

[22] Filed: Mar. 5, 1976

[21] Appl. No.: 664,313

[30] Foreign Application Priority Data

Mar. 11, 1975 Germany .......................... 2510514

[52] U.S. Cl. ................. 242/107.4 R; 242/107.4 A; 244/122 B
[51] Int. Cl.² ................... A62B 35/02; B65H 75/48
[58] Field of Search ............. 242/107.4 R, 107.4 E; 280/744–747; 297/388; 244/122

[56] References Cited
UNITED STATES PATENTS

| | | | |
|---|---|---|---|
| 3,077,324 | 2/1963 | Strickland, Jr. | 242/107.4 B X |
| 3,335,975 | 8/1967 | Dick | 242/107.4 B |
| 3,386,683 | 6/1968 | Howland | 242/107.4 A |
| 3,531,061 | 9/1970 | Davies | 242/107.4 B |

Primary Examiner—George F. Mautz
Assistant Examiner—John M. Jillions
Attorney, Agent, or Firm—Toren, McGeady and Stanger

[57] ABSTRACT

A winding assembly for a vehicle safety belt system is provided with a belt rolling device and a high speed turning device adapted upon actuation of a propellant charge to wind the safety belt at high speeds as a result of the generation of pyrotechnical gases. The high speed turning device and the belt rolling device are interconnected when a given rate of vehicle deceleration is achieved and the high speed turning device is constructed with a rotatably mounted shaft, a pair of annular chambers extending about the shaft, a pair of vanes affixed to the shaft each extending into one of the annular chambers, a first blade fixed within one of the annular chambers and arranged to be engaged by one of the vanes and a second blade extending into the other of the annular chambers and arranged to be engaged by the other vane with the second blade being mounted in driving relationship through the interconnecting means to impart driving rotation of the shaft to the belt rolling device when the high speed turning device is driven by the pyrotechnical gases. The fixed blade is adapted to engage the first vane in order to stop rotation of the vanes and winding of the safety belt.

13 Claims, 14 Drawing Figures

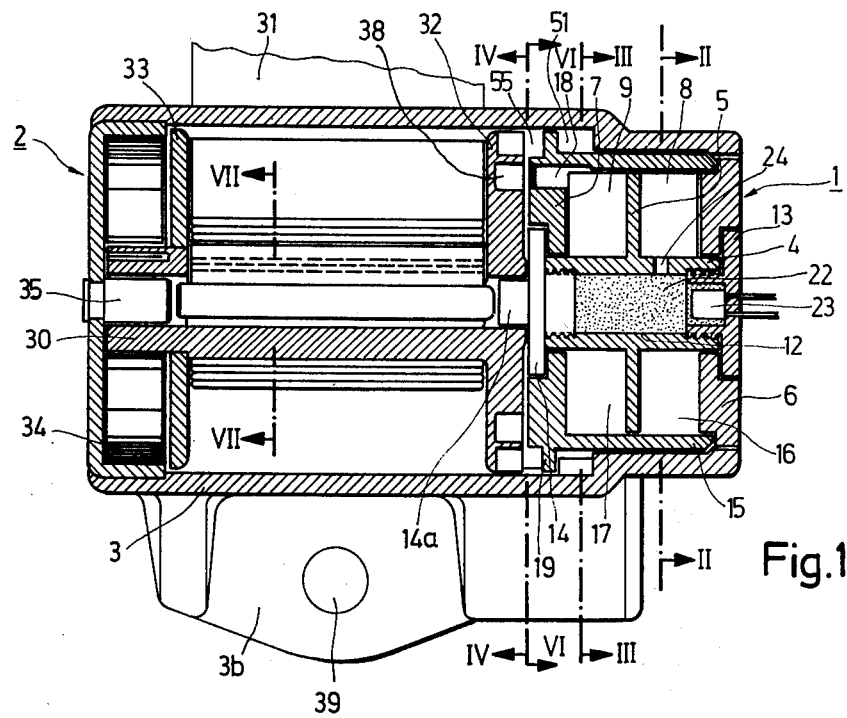
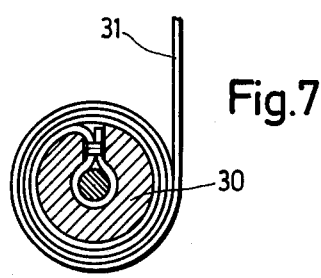
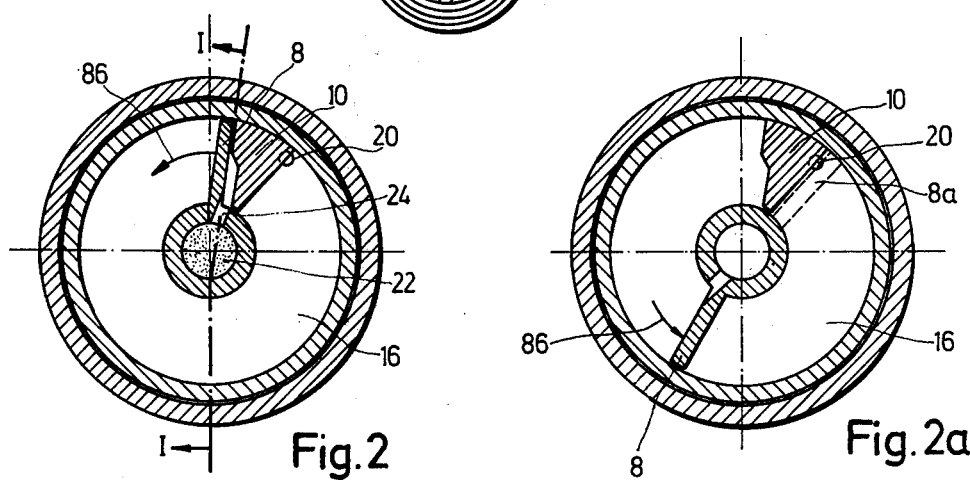

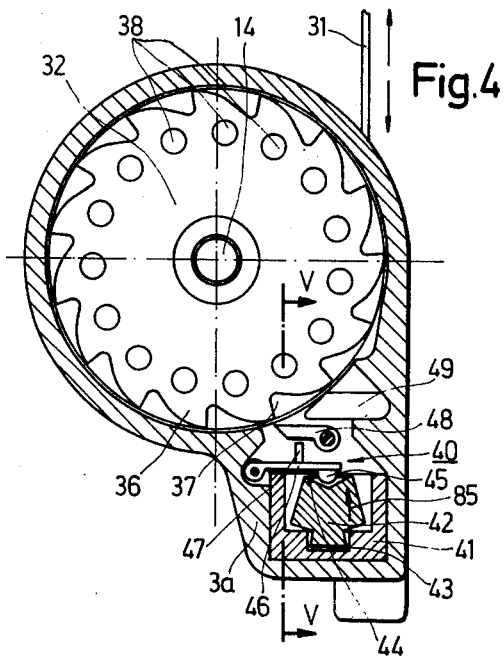
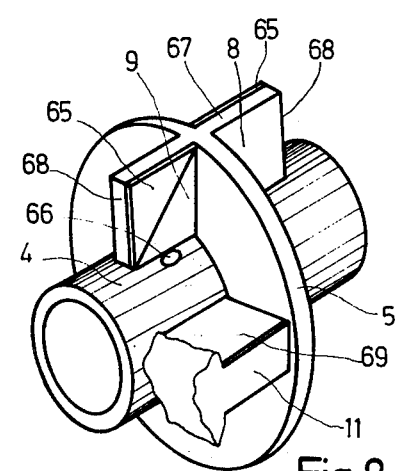
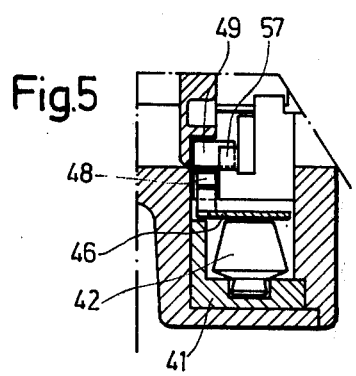
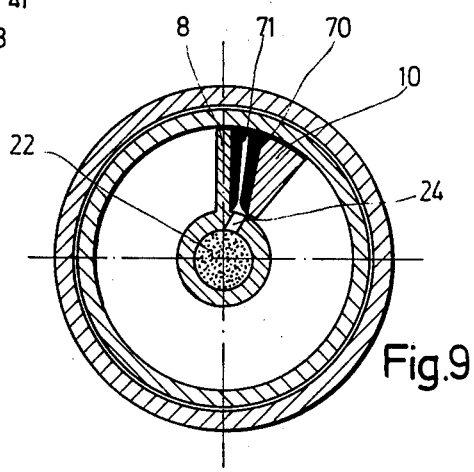
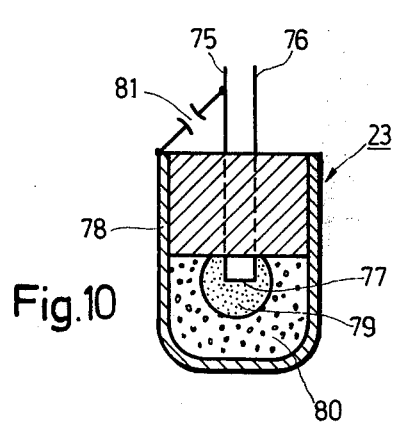
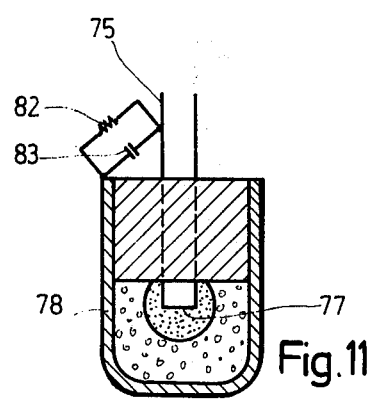

SAFETY BELT SYSTEM WITH PYROTECHNICALLY DRIVEN TURNING DEVICE

BACKGROUND OF THE INVENTION

The invention relates to a winding device for safety belts in vehicles, with a high-speed turning device driven by pyrotechnical gases and interacting with an extraction force limiting device, and with a belt rolling device which is equipped with a pawl device which responds with an inertia pendulum and which is connectable to the high-speed turning device by the aid of the propellant gases.

Owing to the limit space available in motor vehicles and aircraft, attempts are made to ensure that the size of pyrotechnically driven winding devices of the kind will be slightly larger, if at all, than automatic mechanical belt rolling devices. A further problem is that of ensuring that the parts exposed to the power gases will be gastight and that the friction which is generated will nevertheless be very slight. This property is required if satisfactory efficiency is to be obtained with a moderate charge of propellant.

From the prior art a winding device for tightening aircraft and motor vehicle passenger safety belts is already known, in which the winding roller for the belt consists of a rotary piston designed as a belt roller and subjected to propellant gases. In this winding device the rotary piston, provided with a vane, can only be rotated by about 310°, which in general does not suffice to render it sufficiently taut.

The purpose of the invention is to provide a compactly constructed winding device for safety belts wherein the drawbacks of known devices will be avoided, and particularly one which wire ensure that the winding roller can be turned through a sufficient angle for the required belt tension.

SUMMARY OF THE INVENTION

Briefly, the present invention may be defined as a winding assembly for a vehicle safety belt system which comprises a belt rolling device having a safety belt arranged in winding engagement therewith, a high speed turning device adapted to be driven by pyrotechnical gases, means for generating the pyrotechnical gases to drive the turning device when the vehicle is decelerated at a given rate, and interconnecting means for connecting the high speed turning device with the belt rolling device to effect winding therein of the safety belt when the pyrotechnical gases are generated. More specifically, the invention is directed to the structure of the high speed turning device which comprises a rotatably mounted shaft, means defining a pair of annular chambers about the shaft, a pair of vanes affixed to the shaft, said vanes extending radially from the shaft, one into one of said annular chambers and the other into the other of said annular chambers, a first fixed blade extending into one of the annular chambers and arranged to engage one of the vanes to stop rotation thereof, a second blade extending into the other of the annular chambers and arranged to be engaged by the other of the vanes, said second blade being mounted in operative relationship with the interconnecting means to impart driving rotation of the shaft therethrough, and means for introducing the generated pyrotechnical gases into the annular chambers to effect rotation of the shaft, with the blades and the vanes being arranged to permit rotation of the shaft by the propellant force of the pyrotechnical gases against the vanes and thereby to effect winding of the safety belt until said one vane engages said first fixed blade whereupon the rotating action is stopped.

In the application of the invention, a two-sided pin is provided which is connected with a shaft on the pin there is rotatably mounted one end of the rear cover of a high-speed turning device and on the other end of the pin a side disc of the belt rolling device is rotatably mounted. The side disc has the form of a ratchet wheel having a number of borings distributed over its periphery.

In a further development of the invention, a bolt which is inserted in the rear annular chamber, preferably in the upper edge of the rear cover, can be actuated by the propellant gases and is insertable into one of the borings of the side disc of the belt rolling device.

The invention also includes a pendulum which responds to inertia and which is connected with a small pawl which, upon deflection of the pendulum, can be raised by means of a rocker, thus engaging within a gap between the teeth of the ratchet wheel, in which process it raises a main pawl and causes it to drop into the gap without undue impact.

The invention enables an automatic mechanical belt rolling device of the usual kind to be combined with a pyrotechnically operated belt tightening device within a minimum of space, with this object being considerably facilitated by the fact that the solid propellant charge is accommodated in the hollow shaft of the high-speed turning device.

Despite the compact construction, the high-speed turning device contains two annular chambers with rotary pistons which, by means of their vanes, subjected to the propellant gases, enable the belt drum to perform almost two complete rotations. This compact construction is further facilitated by the fact that the belt rolling device and the shaft of the high-speed turning device are mounted on one common pin with only a small gap between them. This enables the two assemblies to be rapidly interconnected by means of the bolt subjected to the propellant gases.

The principle is already known of providing winding devices for belts with a pawl which locks the belt drum when the vehicle decelerates, e.g. owing to the application of the brakes. According to the prior art, a device is known wherein a pawl is lifted, by a pendulum responding to inertia, into one of the teeth of the ratchet wheel. This direct insertion of the pawl into the sharp teeth of the ratchet wheel places an excessive strain on both parts. The provision of a small pawl as a preliminary pawl engaging the tooth gap before the main pawl does so, in accordance with the invention, ensures more gentle engagement of the main pawl, thus considerably lengthening the life of the entire pawl system. Furthermore, the main pawl can be constructed with a rounded front edge and also with a rounded part corresponding to the base of the teeth, providing an improved seating and enabling greater forces to be transmitted.

According to a further characteristic of the invention, a first annular gap between the housing and the outer casing contains a toothed rack which can rotate freely in a widened portion, when the high-speed turning device is caused to rotate by the propellant gases, whereas when the high-speed turning device rotates in the reverse direction the rack rolls between the housing and the casing with dissipation of energy.

In order to ensure, after a vehicle has made impact and the belt become taut as a result, that its wearers will be caught up in as comfortable a manner as possible, the kinetic energy acting on the occupants as a result of the forward acceleration is converted in a simple manner into deformation energy by the toothed rack provided between the internal wall of the housing and the cylindrical casing. This force limiting device according to the invention thus provides for the force of a traject limited to approximately two rotations and therefore necessitates hardly any of the additional space required for constructions already known.

In a further development of the invention, a backed-off attachment is provided on the outer periphery of the rear cover of the high-speed turning device, so that the cover forms, between the side disc acting as a ratchet wheel and the housing, a second annular gap into which is inserted a wedge, which latter is provided with an elastic tongue and on a rotation of the high-speed turning device due to the propellant gases, is caused to accompany this movement until it presses against a bearing part of the main pawl, in which process its tongue, which then moves forward and comes to rest against an edge of the second annular gap, blocks its return movement and prevents the main pawl from entering the gap. This system provides a simple means of nullifying the locking of the main pawl in the ratchet wheel, since the belt rolling device must not be locked during the return rotation or extraction of the belt, which occurs when the passenger is restrained.

In a further embodiment of the invention the vanes and the ring disc are sealed off against one another and against the casing by means of plastic parts which are mounted on the latter and become plastic or are deformable as a result of the heating caused by the propellant gases, the plastic parts being wholly or partly constructed as coatings.

It has been found in tests that to ensure satisfactory efficiency for the propellant gases, the vane surfaces in the annular chambers must be efficiently sealed even at high temperatures. By coating the vane surfaces with plates or parts made of foamable polystyrene, for instance, a foam with a relatively tight cell structure is caused to form, under the action of the hot propellant gases, and ensures a fully satisfactory sealing effect.

To ensure the required temperature range for the use of a winding device, i.e., $-40°$ to $+90°$, and a life of at least 10 years for the apparatus, provided no abrasive substances find their way in between the rotating components during the consumption of the propellant, it is proposed, according to a further characteristic of the invention, that the solid propellant charge should consist of a pyrotechnical composition in a pulverous or granulate form, consisting of 55–75% sodium azide ($NaN_3$) and 25–45% copper (II)-oxide ($CuO$). The propellant according to the invention offers the advantage of being suitable for use under temperature conditions ranging from $-40°$ to $120°$ and that Cu forms during combustion and serves, in particular, as a lubricant while the toothed rack is performing its rolling movement, thus preventing it from jamming between the housing and the cylindrical casing.

The propellant charge is preferably ignited by means of a primer capsule which, according to the invention, is provided with a preset puncturing point or a capacitative blocking with undamped or damped transfer resistance. The preset puncturing point already responds at a certain defined voltage which is far below the rupturing voltage between housing and detonation bridge. The capacitative blocking ensures, for example, that an electrostatic charge of up to 500 pF and 5 kV, in the case of an undamped discharge, corresponding to 0 ohms, will not cause the primer capsule to detonate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1: a longitudinal section along the lines I—I through the winding device in FIGS. 2 and 3.

FIG. 2: a section along the lines II—II of FIG. 1.

FIG. 2a: a section in accordance with FIG. 2, with the vane positions occurring when the belt is tightened.

FIG. 3a: a section in accordance with FIG. 3, with vane positions corresponding to FIG. 2a.

FIG. 4: a section according to the lines IV—IV of FIG. 1.

FIG. 5: a section according to the lines V—V of FIG. 4.

FIG. 7: a section according to the lines VII—VII of FIG. 1.

FIG. 8: a view, in perspective, of the central part of a high-speed turning device.

FIG. 9: a section according to FIG. 2, with a sealing bag.

FIG. 10: a primer capsule with a preset puncturing point.

FIG. 11: a primer capsule with a capacitative blocking.

DETAILED DESCRIPTION OF THE PREFERRED EMBODIMENTS

Figure 3:
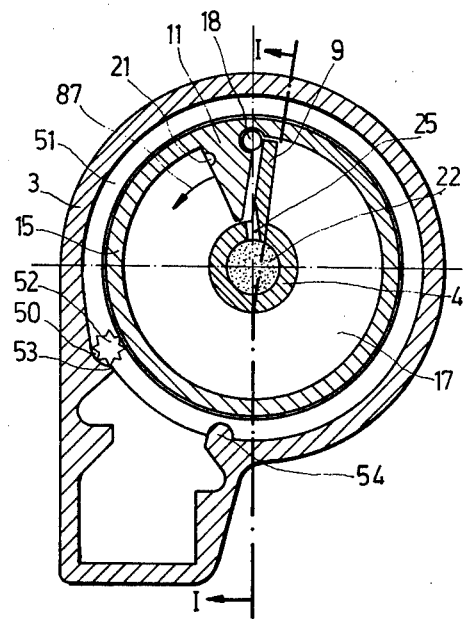
FIG. 3: a section along the lines III—III of FIG. 1.

The main assemblies of a winding device according to FIG. 1 consist of a high speed turning device 1 and a belt rolling device 2, installed together in a housing 3. The high speed turning device 1 consists of a shaft 4 with an annular disc 5, a front cover 6, a rear cover 7 and rotating vanes 8 to 11. The shaft 4 is rotatably mounted on the front and rear cover and has a boring 12 accommodating pins 13 and 14 each of which are provided with a collar with the rear pin 14 being of the two-sided type, acting as a trunnion and having a fixed and 14a. The rear cover 7 is provided, with a casing 15 which extends in a dish-shaped configuration as far as the front cover 6 and is mounted thereon. This provides, between the shaft 4 and the casing 15, two annular chambers 16 and 17 separated from each other by the annular disc 5. Each of the annular chambers consists of two rotating vanes, of which the vane 8 and 9 are integral with the shaft 4 and the annular disc 5, while the vane 10 is attached to the front cover 6 (See FIG. 2) and the vane 11 to the rear cover 7 (see FIG. 3). As the front cover 6 is rigidly connected to the housing 3 and the rear cover 7 is rotatably mounted on the shaft 4 and the flanged pin 14, it is only the vane 10 that is non-rotatable in the front annular chamber 16. A small bolt 18 is inserted in the transition between the rear cover 7 and the casing 15. the rear cover also has an attachment 19. From each of the annular chambers a boring half embedded in the vane passes through the cover to the outside, i.e., the boring 20 in the case of the front annular chamber (see FIG. 2) and the boring 21 in the case of the rear annular chamber (see FIG. 3).

The boring 12 of the shaft 4 contains a solid propellant charge 22, consisting of powder or granulate, either filled or cast into the said boring. The propellant charge preferably consists of a mixture of 55 to 75% sodium azide and 25 to 45% copper (II) oxide, which has the properties and advantages already described in the foregoing. The solid propellant charge 22 is ignited by a primer capsule 23 inserted in the front pin 13. The wall of the shaft has a boring 24 for the front annular chamber 16 (see FIG. 2) and a corresponding boring 25 for the rear annular chamber 17 (see FIG. 3).

The belt rolling device 2 consists, in a known manner, of a belt roller 30 onto which can be wound a belt 31, a front and a rear side disc 32 and 33 and a winding spring 34 constructed as a helical spring. The belt roller 30 is rotatably mounted on the pin 14a of the high speed turning device 1 and a pivot pin 35 mounted in the housing 3. The front side disc 32, made in one piece with the belt roller 30, is constructed, on the side facing towards the high speed turning device, in the form of a ratchet wheel with teeth 36 and tooth gaps 37, a number of borings 38 being distributed around its periphery.

According to FIGS. 4 and 5, a housing attachment contains a pawl system 40 which responds to inertia and which interacts with the ratchet wheel 32. The pawl system comprises a pendulum 42 inserted in a boring 43 of a housing insert 41. The pendulum has a conical recess 44 which is engaged by hemispherical projection 45 of rocker 46. The rocker is also fitted with a crosspiece 47 which is capable of lifting a small pawl 48 which in its turn can lift a main pawl 49. The entire winding device can be mounted by a flange 3b of the housing attachment 3a, with a bolt inserted through a boring 39.

Between the inner wall of the housing 3 and the casing 15, as shown in FIGS. 1 and 3, a toothed gear 52 is inserted in a widened portion 50 of a first annular gap formed between the cover attachment 19 and the housing 3, the gear being prevented, by a lug 53 or support 61, from falling out of the annular gap. The first annular gap 51 is delimited at the other end by a reinforced edge 54.

Figure 6:
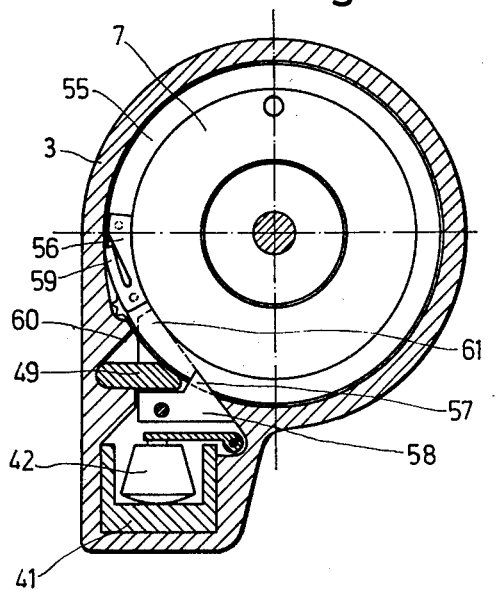
FIG. 6: a section according to the lines VI—VI of FIG. 1.

On the other side of the attachment 19 of the cover 7, as shown in FIG. 6, a wedge 56 can be inserted between the cover, the ratchet wheel 32 and the housing 3. The wedge, preferably consisting of plastic with resilient properties, is inserted in such a way that is is not caused to accompany the movement when only the belt roller 30 is rotating. It is only when the high speed turning device 1 rotates that the wedge is carried along by the cover 7 and pressed against an attachment 57 of the support 58 for the main pawl 49. This process releases a tongue 59 which belongs to the wedge 56 and which can thus come to rest against an edge 60 at the end of the annular gap 55.

FIGS. 8 and 9 show various versions of a sealing system between the rotating parts of the high speed turning device 1. In the view in perspective, provided in FIG. 8, triangular coatings of plastic 65 are provided on the vanes 8 and 9. These coatings, preferably consisting of foamable polystyrene, seal the rotating vanes, when the hot gases flow through borings 66, of which the only one shown is that adjacent to the vane 9, the coatings either becoming pasty of foaming, in either of which cases they seal the outer sealing edges 67 and 68 of the vanes 8 and 9. In accordance with the example shown in FIG. 8, the vanes 10 and 11 connected with the covers may be provided with a quadrangular plastic coating 69, covering the entire surface of the vane. A further version of the sealing system shown in FIG. 9, corresponds to that shown in FIG. 2. In this case a plastic bag 70, open towards the boring 24, is interposed between the vanes 8 and 10. At its bending point 71 the bag 70 is so thin that it tears in this position, on the impact of the hot propellant gases developed by the propellant charge 22, as a result of which the two parts of the bag, on the rotation of the vanes 8 and/or 10, remain with these latter and seal them.

The primer capsule 23, in accordance with FIGS. 10 and 11, is to be prevented from accidentally detonating from a voltage caused by an electrostatic charge. With a primer capsule not so protected, a voltage of this kind can act as an internal breakdown voltage between a bridge 77 formed from the ignition wires 75 and 76 and a housing casing 78 of the primer capsule, in which process an ignition charge and a priming charge are initiated. In FIG. 10 the protection is provided by a preset puncturing point (spark gap) 81, situated between the ignition wire 75 and the housing casing 78. This spark gap responds when a certain defined voltage is reached, which is far below the breakdown voltage inside the primer capsule. According to FIG. 11, a capacitor 83, bridged with a safety resistor 82, is provided between the ignition wire 75 and the housing casing 78, its capacity being far lower than the breakdown voltage between the ignition bridge 77 and the casing 78.

The winding device according to the invention operates as follows:

In normal use the winding device operates in the known manner, in that the helical spring 34 winds the belt 31 onto the belt roller 30 with a suitable force. When the vehicle decelerates, e.g., as a result of a sudden application of the brakes, the pendulum 42 in the pawl device 40 oscillates in the direction shown by an arrow 85, as a result of which the rocker 46, as well as the small pawl 48, via the crosspiece 47, assume the position in which they engage a gap 37 between the teeth of the ratchet wheel 32 (FIG. 4). The small pawl 48, which thus serves as a prelimiary locking device, then lifts the main pawl 49 into the same gap 37, blocks the ratchet wheel 32 and thus prevents the belt 31 from being extracted further. With this graduated locking system, with the small pawl 48 serving as a preliminary locking device, the main pawl 49 and the ratchet wheel 32 are largely protected from wear and damage, and the locking action can be effected more rapidly, owing to the smaller mass of the small pawl 48. The rotationally symmetrical flat supportiing system for the vertical pendulum 42 in the housing insert 41 ensures a stable position of rest for the pendulum in the case of normal vehicle movements and also ensures the response of the locking system to deceleration effects occurring from any direction. On the slackening of the belt load and cessation of the vehicle deceleration, all parts of the pawl device 40 are returned to their position of rest.

Figure 3A:
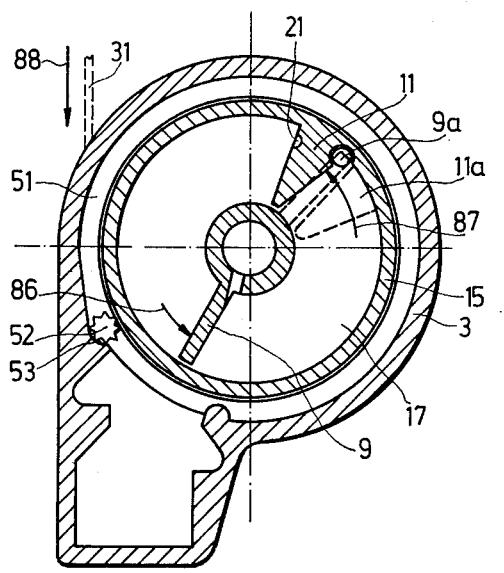

If a vehicle collides with any object, a sensor, not shown in the drawing, produces an impulse in the primer capsule 23, which ignites the propellant charge 20 situated in the shaft 4. The propellant gases thus developed flow simultaneously through the borings 24 and 25 into the two annular chambers 16 and 17 between the vanes 8 and 10 (FIG. 2) and 9 and 11 (FIG. 3). In the annular chamber 17 the small bolt 18 is immediately actuated, moves into one of the borings 38 in the ratchet wheel 32 and thus connects the high speed turning device 1 with the belt rolling device 2. In the annular chamber 16 the propellant gases rotate the vane 8 in the direction shown by the arrow 86 (FIG. 2), while in the annular chamber 17 they cause the vane 11 attached to the rear cover 7 to rotate in the direction shown by the arrow 87 (FIG. 3), in which process the vane 9 rigidly connected to the vane 8 via the annular disc 5 is caused to participate in the rotation. In the position shown in FIG. 2a the vane 8, in relation to the vane 10, which is the only one secured against relative rotation, has moved by approximately half a rotation, in the annular chamber 16, in the direction shown by the arrow 86. FIG. 3a shows the corresponding position for the vane 9 in the annular chamber 17. It may be seen that the vane 11 and thus the belt roller 30 have within this same period performed an almost complete rotation, the belt 31 being thereby retracted, in the direction shown by the arrow 88.

The high speed turning device can only tighten the belt to the point at which the blade 8 comes to rest against the fixed blade 10 and the blade 11 against the blade 9, after not quite two rotations. These circumstances are shown by the broken lines in FIGS. 2a and 3a, the blade being shown in the end position with 8a, 9a and 11a. The rotation of the blades in the annular chambers 16 and 17 is damped, over the last portion of the traject, as a result of the fact that the air present in the annular chambers is compressed between the blades before it can escape from the small borings 20 and 21. The damping of the belt tightening device can thus be varied by adjusting the size of these borings. It is improbable that the complete rotation angle of about 620° has to be utilized in order to tighten the belt. If a smaller rotation angle is adequate for the tightening of the belt, the propellant gases will emit their energy with greater force over the shorter rotation traject.

Figure 3B:
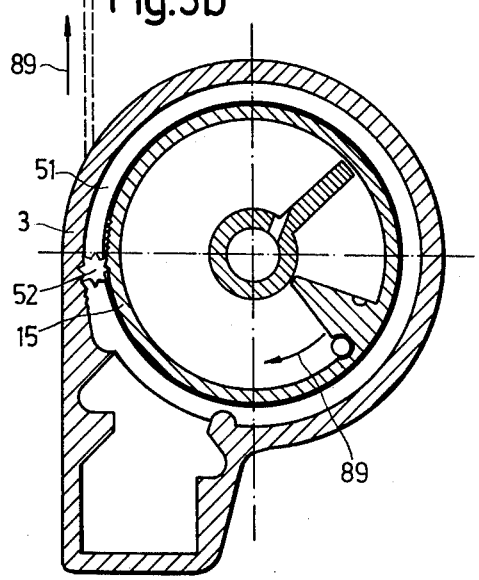
FIG. 3b: a section according to FIG. 3, when the winding device is rotated in the reverse direction.

After the belt has pressed the passenger into his seat, during the collision, the kinetic energy which is inherent in his body and which is still present and which interacts with the deformation of the vehicle has to be reduced by the toothed gear 52 serving as a force limiting device, on the return rotation of the belt rolling device, in accordance with the arrows 89 (See FIG. 3b). While the gear, in the course of the belt tightening process, only rotates loosely in the widened portion 53 of the first annular gap 51 (see FIG. 3a), it will be carried along by the casing 15, on the return rotation of the high speed turning device 1, and rolls between the casing 15 and the housing 3 in the first annular gap 51, resulting in the absorption of energy by the imprint of the tooth profile (see FIG. 3b). The dimensions of the toothed while it is rolling in the first annular gap 51 gear 52 are preferably made small enough to ensure that the high speed turning device 1, performs about two full rotations, with equal absorption of energy, before the rack 51 encounters the reinforced edge 54.

During the belt tightening phase of operation of the device, the wedge 56 shown in FIG. 6 is carried along and, by making impact with the attachment 57, prevents the main pawl 49 from engaging a gap 37 in the ratchet wheel 32, the wedge 56 being held in this position by the projection of its tongue 59. This is necessary because during the reverse rotation of the winding device the belt drum 30 must not be blocked, so that the kinetic energy can be dissipated by the force-absorbing toothed rack 52.

While specific embodiments of the invention have been shown and described in detail to illustrate the application of the inventive principles, it will be understood that the invention may be embodied otherwise without departing from such principles.

We claim:

1. A winding assembly for a vehicle safety belt system comprising a belt rolling device having a safety belt arranged in winding engagement therewith, a high speed turning device adapted to be driven by pyrotechnical gases, means for generating said pyrotechnical gases to drive said turning device when said vehicle is decelerated at a given rate, and interconnecting means for connecting said high speed turning device with said belt rolling device to effect winding therein of said safety belt when said pyrotechnical gases are generated, said high speed turning device comprising: a rotatably mounted shaft; means defining a pair of annular chambers about such shaft; a pair of vanes affixed to said shaft, said vanes extending radially from said shaft, one into one of said annular chambers and the other into the other of said annular chambers; a first fixed blade extending into one of said annular chambers and arranged to engage one of said vanes to stop rotation thereof; a second blade extending into the other of said annular chambers and arranged to be engaged by the other of said vanes, said second blade being mounted in operative relationship with said interconnecting means to impart driving rotation of said shaft therethrough; and means for introducing said generated pyrotechnical gases into said annular chambers to effect rotation of said shaft; said blades and vanes being arranged to permit rotation of said shaft by the propellant force of said pyrotechnical gases against said vanes and thereby to effect winding of said safety belt until said one vane engages said first fixed blade.

2. An assembly according to claim 1 wherein said shaft is formed with a hollow interior and wherein said means for generating said pyrotechnical gases comprises a solid propellant charge loaded into said hollow interior and primer means for detonating said charge, said shaft being formed with orifice means extending from said hollow interior into said annular chambers to permit introduction of said pyrotechnical gases thereinto upon detonation of said charge.

3. An assembly according to claim 1 wherein said means defining said annular chambers include a cover member rotatably mounted in said shaft between said belt rolling device and said high speed turning device, wherein said belt rolling device includes a disc rotatably mounted in generally concentric turning relationship with said cover member and including a plurality of borings opening towards said cover member, said disc being arranged to effect winding of said safety belt when said disc is rotatably driven, and wherein said interconnecting means include a bolt mounted on said cover member to be actuated by said pyrotechnical gases for engagement into one of said borings to drivingly engage said cover member with said disc, said second blade being affixed upon said cover member.

4. An assembly according to claim 3 further including means for preventing unwinding of said safety belt out of said belt rolling device comprising pendulum means actuated by deceleration of said vehicle, pawl means actuated by said pendulum means and ratchet means formed on the periphery of said disc and adapted to be engaged by said pawl means upon actuation thereof by said pendulum means to lock said disc of said belt rolling device against rotation in the unwinding direction of said belt.

5. An assembly according to claim 4 wherein said pawl means comprise a pair of pawls, one smaller and one larger, with a rocker being provided to be actuated by said pendulum means to cause actuation of said smaller pawl, said smaller pawl being mounted to actuate said larger pawl into engagement with said ratchet means upon actuation of said rocker by said pendulum.

6. An assembly according to claim 4 including means for preventing actuation of said pendulum means when said shaft is rotatably driven by said generated pyrotechnical gases.

7. An assembly according to claim 1 including a housing, a casing formed as part of said means defining said annular chambers, said housing surrounding said casing to form therebetween an annular gap, a toothed gear mounted within said annular gap and adapted to rotate freely therein when said casing is revolving in a first direction relative to said housing as a result of rotation of said shaft to wind said safety belt, with rotation of said casing in an opposite direction resulting from unwinding of said belt operating to cause said rack to become compressed between said housing and said casing to effect absorption of energy tending to unwind said belt.

8. An assembly according to claim 6 including a housing, means in said cover member defining between said cover member and said housing a second annular gap, said means for preventing actuation of said pendulum means comprising a wedge inserted within said second annular gap, a resilient tongue formed on said wedge, and a bearing member on said pawl means, said second annular gap being configured to cause said wedge to be driven therein to bring said resilient tongue into engagement with said bearing member when said high speed turning device is driven by said pyrotechnical gases in order to thereby prevent actuation of said pawl means into engagement with said ratchet means, said assembly further including an edge member formed in said second annular gap to engage said resilient tongue after said tongue has engaged said bearing member to prevent reverse movement of said wedge away from engagement of said resilient tongue with said bearing member.

9. An assembly according to claim 1 wherein said means defining said annular chambers include a casing having an inner wall radially spaced from said shaft, said vanes extending radially from said shaft up to said inner wall, and an annular disc affixed to said shaft and located to define each of said annular chambers on opposite sides thereof, said assembly further including plastic sealing means applied upon the parts of said assembly defining said annular chamber in a manner to produce a sealing effect for said chamber, said plastic sealing means being made of a material which tends to become molten as a result of the heat of said pyrotechnical gases thereby to facilitate relative movement between adjacent parts when said pyrotechnical gases are generated.

10. An assembly according to claim 9 wherein said plastic sealing means are formed as coatings upon the parts of said assembly.

11. An assembly according to claim 2 wherein said solid propellant charge comprises a pyrotechnical composition in pulverous granulate form consisting of 55 to 75% sodium azide ($NaN_3$) and 25 to 45% copper (II) oxide (CuO).

12. An assembly according to claim 2 wherein said primer means comprises a primer capsule having a preset puncturing point effective with both undamped and a damped transfer resistance.

13. An assembly according to claim 8 wherein said primer means comprises a primer capsule having a capacitative blocking system effective with both an undamped and a damped transfer resistance.

* * * * *